May 7, 1963 R. J. MAY 3,088,756
FITTING FOR HOSE SPRING GUARD
Filed Aug. 10, 1959
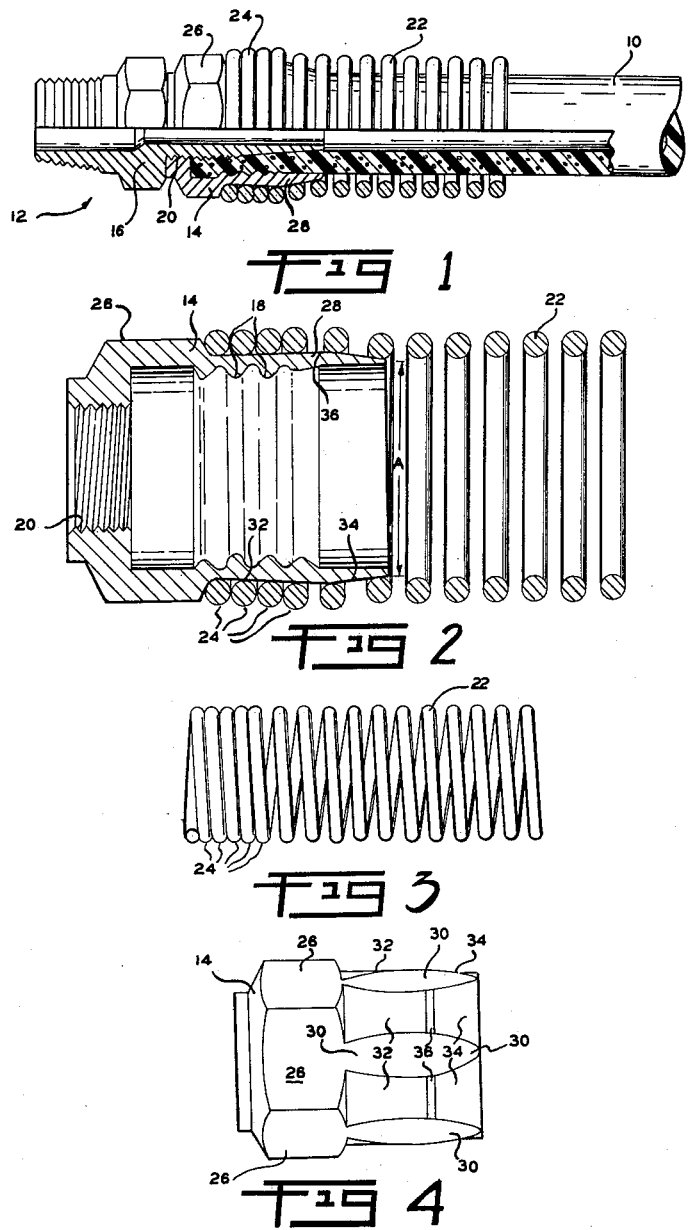
INVENTOR
RICHARD J. MAY
BY Beaman & Beaman
ATTORNEY United States Patent Office 3,088,756
Patented May 7, 1963

3,088,756
FITTING FOR HOSE SPRING GUARD
Richard J. May, Jackson, Mich., assignor to Aeroquip Corporation, Jackson, Mich., a corporation of Michigan
Filed Aug. 10, 1959, Ser. No. 832,634
2 Claims. (Cl. 285—116)

The invention relates to a hose fitting and particularly pertains to the means for maintaining a spring guard upon a hose fitting.

Fitting mounted hose spring guards to prevent the kinking and abrupt bending of flexible hose lines adjacent the fitting have been affixed to the fitting in several ways. However, conventional methods are usually objectionable for one or more of the following reasons. A spring guard must be firmly affixed to the fitting to be effective and hence many fitting manufacturers make two embodiments of a particular fitting to obtain spring guard mounted and non-guard models wherein the spring guard models are pre-assembled at the factory to obtain the necessary strength. Another objection to many spring guard fitting connections results from the excessive bulk of a sleeve or other member often used to grip the guard to the fitting.

It is the purpose of the invention to provide a hose fitting construction wherein a spring guard may be affixed thereto without the need for special tools, threads or projections and wherein vibration will not affect or loosen the connection to the fitting.

Another object of the invention is to provide a hose fitting construction wherein no modification to the fitting is required for affixing a spring guard thereto and no projections, threads, or other devices are required which interfere with uniform appearance of the fitting.

A further object of the invention is to provide a fitting construction wherein a conventional spring guard may be positively affixed thereto without the need of clamps, sleeves, etc., and wherein the guard adds little to the radial dimension of the fitting.

These and other objects of the invention will become apparent from the following description of an embodiment thereof and from the drawings wherein:

FIG. 1 is a partly sectioned elevational view of a hose, fitting and spring guard in accordance with the invention in assembled relation, FIG. 2 is an enlarged, elevational, sectioned detail of the socket and spring guard when assembled, FIG. 3 is an elevational view of the spring guard prior to assembling to the socket, and FIG. 4 is an elevational view of the socket illustrating the outer surfaces thereof.

As illustrated in FIG. 1, the hose 10 may be of the rubber type having a fabric reinforcement and is provided at its end with a reuseable fitting 12 consisting of an annular socket 14 and a tapered nipple 16. The socket is provided with a plurality of annular ribs or serrations 18, FIG. 2, which engage the exterior surface of the hose 10 and the nipple 16 is received within the bore of the hose and compresses the hose in the region of the ribs whereby the fitting is securely affixed to the hose by the gripping of the ribs 18 and the compression of the hose between the nipple and socket. The nipple 16 is externally threaded for cooperation with the threads 20 of the socket and thus the nipple and socket may be maintained in assembled relation. The above described structure is conventional and further description is considered unnecessary.

To prevent the hose 10 from bending too abruptly and to support the hose in the region of the fitting, a spring guard 22 is supported on the socket and extends for a distance along the hose. The guard consists of a spiral spring of an inner diameter slightly larger than the outer diameter of the hose and the coils 24 adjacent one end thereof are very closely wound and, in fact, are in engagement with each other, see FIG. 3.

Referring to FIG. 2 and FIG. 4, it will be noted that the socket 14 is machined from hexagonal stock whereby wrench engaging flats 26 are provided on an exterior portion and the skirt 28 of the socket is partially turned down in a lathe-like operation whereby the skirt surface consists of flats 30 and conical surfaces 32 and 34. The section of FIG. 2 is taken through the conical surfaces 32 and 34 and it will be observed that the surface 32 converges toward the wrench flats 26 while the surface 34 converges toward the hose receiving end of the socket. A land 36 is formed intermediate the surfaces 32 and 34 and preferably the land has an axial dimension and is cylindrical. It will be understood that it is within the purview of the invention that the land or hump 36 may consist of an annular line defined by direct intersection of the conical surfaces.

The surfaces 32 and 34 receive the hose spring guard and provide a locking connection in the following manner. The dimension A of the socket, e.g., the diameter of the edge of surface 34 adjacent the end of the socket, is substantially equal to the inner diameter of the spring 22. The diameter of the land 36 is, of course, greater than the dimension A and the minimum diameter of the surface 32 adjacent the wrench flat portion is substantially equal to dimension A as indicated in FIG. 2. The conical surface 32 has a greater axial length than the surface 34. As the size and dimension of the above described socket configurations are of importance in obtaining optimum performance in establishing the connection between the spring guard and socket, a better understanding of the invention may be achieved by considering the actual dimensions of a typical socket.

In a fitting which employs a spring guard having an inner diameter of .875", the total length of the socket skirt, e.g., the axial length of the socket consisting of surface 32, land 36 and surface 34, will be about .700". The axial lengths of surfaces 32 and 34 are .475" and .175" respectively and the axial length of land 36 is .050". The dimension A will be .875" and the diameter of the skirt at the land 36 will be .915". It is thus apparent that the diameter of the skirt is .040" greater at the land than at the rightmost edge of surface 34. The spring wire has a diameter of .105" whereby at least four of the coils 24 will contact surface 32.

To assemble the spring 22 to the socket 14, the socket must be firmly gripped and held stationary. For instance, the socket may be clamped in a vise. The spring 22 is then axially aligned with the socket and the coils 24 are pushed onto the surface 34 while the spring is rotated in a clockwise direction. The spring is rotated and pushed toward the socket until the spring abuts the trailing edge of the wrench flat portion as shown in FIGS. 1 and 2. The spring and socket connection is now complete. As the described hose guard is disclosed as being used with reuseable fittings which are usually assembled to the hose at the location of use, the spring is usually placed over the hose first, the fitting affixed to the hose, and then the spring affixed to the fitting socket.

Referring to FIG. 2, it will be noted that the coils of the spring guard 22 now lie upon the surfaces 32 and 34 and that these surfaces have expanded the diameter of the spring in the region of the conical surfaces. The coils will intimately grip the surfaces 32 and 34 due to the resilient character of spring coils, and a very effective connection between the spring and socket is produced. Because of the spring construction and length of surface 32, most of the closely wound coils 24 will grip surface 32 and a high resistance to pulling the spring 22 from the socket is achieved because of the conical configuration of the surface 32.

To remove the spring guard 22 the socket should be placed in a vise and the spring pulled away from the socket while being rotated clockwise to reduce the grip of the spring coils.

As the primary gripping force is produced by the coils 24 encompassing surface 32, the greater axial length of surface 32 provides adequate support to prevent the spring guard from "wobbling" or transversely shifting on the socket under bending forces and vibration will not weaken or loosen the connection.

Another significant advantage of the invention lies in the fact that the described socket construction may be used in both spring guard and non-spring guard applications without requiring modification, and hence the fitting may be custom assembled to the job with a minimum of inventory requirements.

I claim:

1. In combination, a hose, a fitting secured internally to an end of said hose and including a socket in gripping engagement with the external surface of said hose end and having an exterior surface defining first and second substantially frusto-conical smooth surfaced portions, the bases of said portions abutting and forming an annular land, and a coil spring mounted over said socket exterior surface and land by a movement of translation and having a first plurality of turns grippingly engaging said first frusto-conical portion of said socket and a second plurality of turns extending from said socket and surrounding said hose adjacent said socket, said spring having a predetermined internal diameter which is less than the mean outer diameter of each of said first and second frusto-conical portions and the diameter of said annular land wherein said first plurality of turns may be radially outwardly deflected and cammed over said second frusto-conical portion and said annular land during said translatory movement, into a position of gripping engagement with said first frusto-conical portion and wherein axial stretching of said spring increases the gripping action of said first plurality of turns on said first frusto-conical portion.

2. The combination according to claim 1 wherein the minimum diameter of said first and second surfaces is approximately equal to the inner diameter of said spring.

References Cited in the file of this patent

UNITED STATES PATENTS

| | | |
|---|---|---|
| 1,836,986 | Paasche | Dec. 15, 1931 |
| 2,166,448 | Schuknecht | July 18, 1939 |

FOREIGN PATENTS

| | | |
|---|---|---|
| 545,717 | Great Britain | June 9, 1942 |
| 918,080 | Germany | July 8, 1949 |